United States Patent [19]
Eitz et al.

[11] Patent Number: 5,355,170
[45] Date of Patent: Oct. 11, 1994

[54] METHOD FOR TRANSMITTING PERIODICALLY REPEATED TELETEXT DATA IN A TELEVISION RECEIVER

[75] Inventors: Gerhard Eitz, Poing; Gerhard Möll, Gräfelfing, both of Fed. Rep. of Germany

[73] Assignee: Telefunken Fernseh und. Rundfunk GmbH, Hanover, Fed. Rep. of Germany

[21] Appl. No.: 773,553

[22] PCT Filed: May 3, 1990

[86] PCT No.: PCT/EP90/00712

§ 371 Date: Dec. 12, 1991

§ 102(e) Date: Dec. 12, 1991

[87] PCT Pub. No.: WO90/13970

PCT Pub. Date: Nov. 15, 1990

[30] Foreign Application Priority Data

May 3, 1989 [DE] Fed. Rep. of Germany ....... 3914697
Nov. 11, 1989 [DE] Fed. Rep. of Germany ....... 3937653

[51] Int. Cl.$^5$ .......................... H04N 7/087; H04N 7/08
[52] U.S. Cl. ..................................... 348/467; 348/468; 348/466
[58] Field of Search ............... 358/146, 147, 142, 141; 340/750; 348/467, 461, 468, 466, 465, 476, 478, 463, 473; H04N 7/087, 7/04, 7/08

[56] References Cited

U.S. PATENT DOCUMENTS

| | | | |
|---|---|---|---|
| 4,614,972 | 9/1986 | Motsch et al. | 358/147 |
| 4,698,677 | 10/1987 | Kinghorn et al. | 358/147 |
| 4,953,022 | 8/1990 | Bugg | 358/147 |

FOREIGN PATENT DOCUMENTS

| | | | |
|---|---|---|---|
| 0264565 | 8/1987 | European Pat. Off. | H04N 7/087 |
| 2146878 | 4/1975 | United Kingdom | H04N 7/087 |
| 2187614A | 9/1987 | United Kingdom | H04N 7/087 |

OTHER PUBLICATIONS

Review HF. XIII, No. 10, 1987, Ophain Be Seiten 283–296; Ir K. van Bruwaene: "De Evolutie van Teletekst", Royal Television Society Journal, vol. 18, No. 5, Oct. 1980.

London GB, pp. 43–45; J. P. Chambers, "Potential of Extended Teletext".

Electronic Components and Applications, vol. 6, No. 1, 1984, Eindhoven NL, pp. 15–29; J. R. Kinghorn "Computer Controlled Teletext".

Primary Examiner—James J. Groody
Assistant Examiner—Safet Metjahic
Attorney, Agent, or Firm—Spencer, Frank & Schneider

[57] ABSTRACT

In order to compatibly transmit teletext data in the form of special characters, fine textures and color hues at higher WST levels, complementary data in the form of one or more associated complementary pages are transmitted for each page of teletext by the broadcaster in addition to the basic teletext data of conventionally structured teletext pages (level 1). The complementary data for some or all teletext pages are transmitted preferably in at least one complementary page. In the receiver, the complementary page(s) associated with a selected teletext page are temporarily stored separately from the corresponding teletext page(s) and processed so that the characters associated with the basic data are displayed in those character positions where there is no complementary data present. The characters associated with the basic data in cooperation with the complementary data are displayed in those character positions where complementary data is present.

9 Claims, 3 Drawing Sheets

METHOD FOR TRANSMITTING PERIODICALLY REPEATED TELETEXT DATA IN A TELEVISION RECEIVER

BACKGROUND OF THE INVENTION

The invention refers to a method for the transmission of preferably periodically repeated teletext data in a television signal wherein on the transmitter side, complementary data for a respective teletext page is transmitted in addition to the teletext basic data of conventionally constructed teletext pages, and wherein, on the receiver side, the teletext data is separated from the television signal, the data belonging to a particular teletext page is collected and the basic data and the complementary data of a desired teletext page are intermediately stored and processed in such a way that the characters allocated to the basic data are made to appear at those character positions where no complementary data is present, and that the characters allocated to the basic data working in conjunction with the complementary data are made to appear at those character positions where complementary data is present. Such a method is known from "Rundfunktechnische Mitteilungen", vol. 27 (1983), issue 3, pages 116 through 134. The invention also refers to a facility for carrying out the method.

With the conventional teletext system at present in use in Europe (with the exception of France), only the so-called "level 1" of the teletext standard WST (world system teletext) is made use of; the system possesses only a limited basic character set for texts and graphic representations. Special characters, fine textures or color hues cannot be reproduced using this "level 1" system. To avoid these shortcomings the WST standard provides, particularly in its expanded stages "level 2" and "level 3", for the transmission of complementary data in so-called pseudo rows (also called "ghost rows") which have addressable row numbers which are not used by the "level 1" but are kept unoccupied in the transmission format. Several rows with the same row number must be used, as required, for the transmission of the required quantity of complementary data as can be seen in FIG. 1 for row number #26 (cf. also the above-mentioned publication "Rundfunk-technische Mitteilungen").

As the teletext receiver does not receive any information concerning the number of pseudo rows transmitted in association with a particular teletext page (basic data), the decoder does riot "know" whether, which and, if applicable, how many pseudo rows have been broadcast for a teletext page. A correct evaluation can, therefore, only be performed if the desired teletext page and all associated pseudo rows are received in full. Moreover, additional storage capacity for every teletext page which is to be stored, for example, 4 kByte, must be kept permanently available in the decoder which cannot be used otherwise in case no pseudo rows are transmitted.

In view of this, it is the object of the invention to render possible an improved transmission or processing of complementary data with a method or a facility respectively of the aforementioned type while also guaranteeing complete compatibility with existing teletext receivers which work according to "level 1".

SUMMARY OF THE INVENTION

The above object generally is solved according to the invention by a method for the transmission of preferably periodically repeated teletext data in a television signal wherein on the transmitter side, complementary data for a respective teletext page is transmitted in addition to the teletext basic data of conventionally constructed teletext pages with the complementary data for a respective page of teletext being transmitted in the form of one or more associated complementary pages; and wherein, on the receiver side, the teletext data is separated from the television signal, the basic data and the complementary data belonging to a particular teletext page are collected, the complementary page(s) allocated to a desired teletext page is/are intermediately stored separately from the associated teletext page(s), and the basic data and the complementary data of a desired teletext page are processed in such a way that the characters allocated to the basic data are made to appear at those character positions where no complementary data is present, and that the characters allocated to the basic data working in conjunction with the complementary data are made to appear at those character positions where complementary data is present.

As a development of the invention, the complementary data for several or all teletext pages is transmitted in at least one complementary page. The number of complementary pages can, therefore, be advantageously reduced.

According to further advantageous arrangements and developments of the method according to the invention the complementary pages are structured in the format of conventional teletext pages; the complementary pages are provided with page numbers in the hexadecimal system; the page numbers of the complementary pages coded in the hexadecimal system are allocated to page numbers of the associated, conventional teletext pages according to a fixed scheme ordered in the decimal system and preferably selectable using a ten-key number keypad; the complementary data is transmitted in the Viewdata (Prestel) build-up code, and separate decoding is provided for the basic data and the complementary data on the receiver side; separate information about the number of complementary pages for each associated, conventional teletext page is transmitted; information is transmitted as to whether and, if applicable, how many complementary pages will have only page-specific complementary data for each complementary teletext page are contained in the teletext cycle; further, separate information about the number of rows used is transmitted in at least one complementary page; separate information is transmitted in the format of a complementary page; at least that complementary data which applies to several pages is transmitted with an increased error protection when compared with the basic data; the complementary data is transmitted with an error protection greater than that of the basic data; and/or the complementary data represents, at least partly, error protection data for the associated basic data which, on the receiver side, is used for correcting and, if necessary, for substituting associated, disturbed basic data.

The invention is more closely explained by means of the embodiment examples illustrated in the drawing.

DETAILED DESCRIPTION OF THE PREFERRED EMBODIMENT

Figure 1:
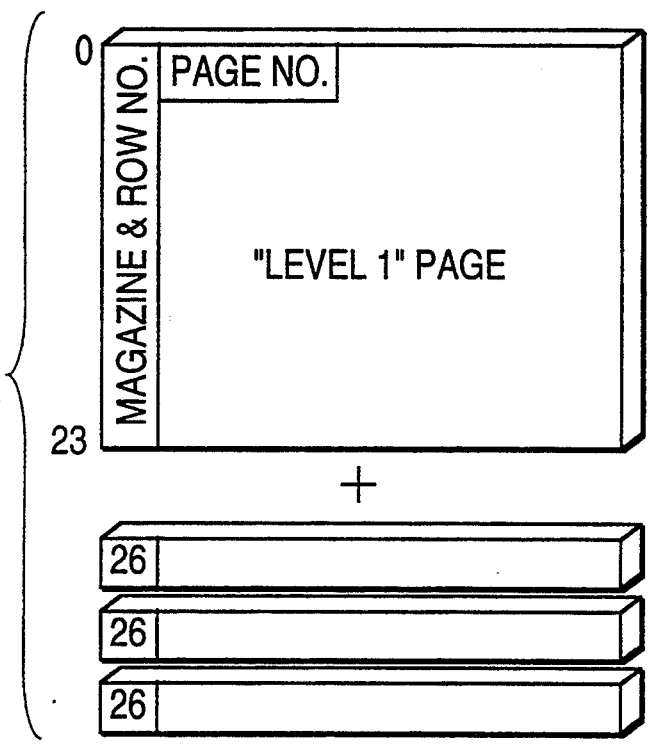
FIG. 1 shows a schematic representation of the known teletext WST standard.

Differently from the teletext WST standard (FIG. 1), so-called complementary pages are transmitted in addition to the usual teletext pages ("basic pages") and the complementary pages are, preferably, structured in the format of the teletext pages.

With the invention-type method according to a first embodiment example (FIG. 2), so-called complementary pages are transmitted in addition to the usual teletext pages ("basic pages") and the complementary pages are, preferably, structured in the format of the teletext pages.

With the invention-type method according to a second embodiment example (FIG. 3), complementary data for several or all teletext pages is transmitted in at least one complementary page.

Figure 2:
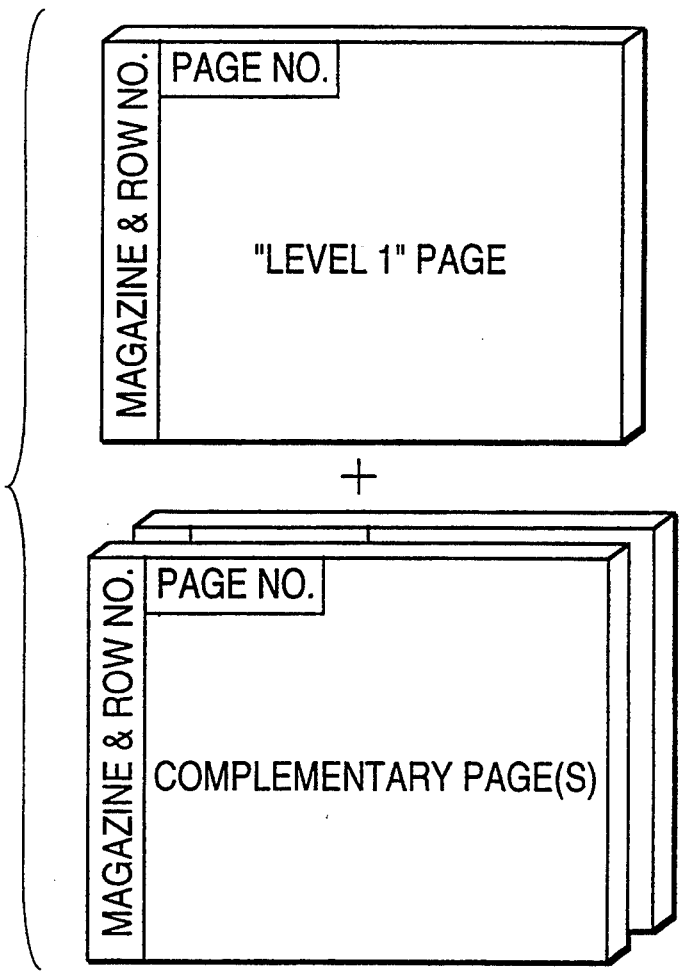
FIG. 2 shows a schematic representation of the invention-type method according to a first embodiment example.
Figure 3:
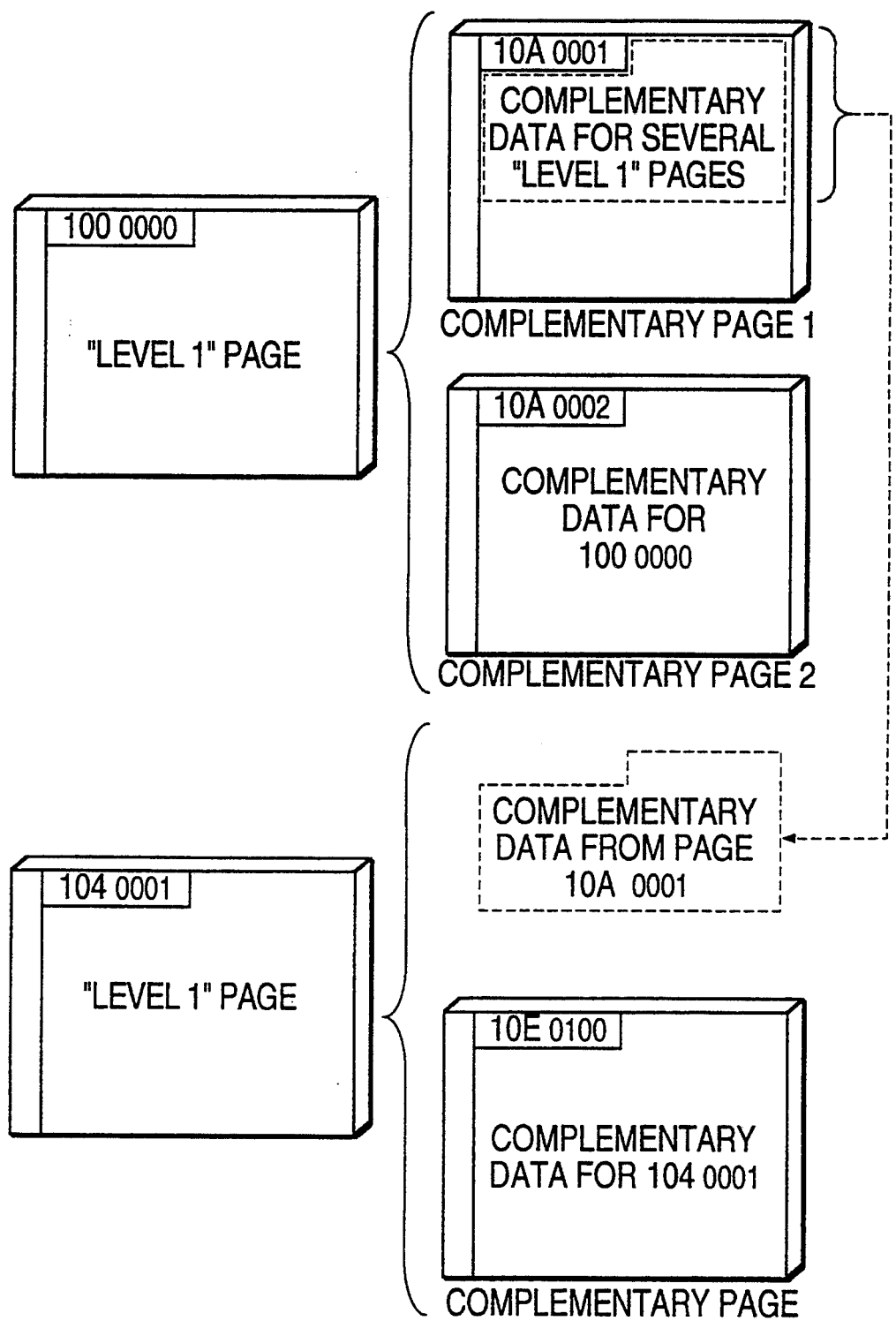
FIG. 3 shows a schematic representation of the invention-type method according to a second embodiment example.

As FIGS. 2 and 3 show, the complementary page(s) allocated to a certain teletext page contain the missing data ("complementary data") for a higher WSR level (for example, level $\frac{2}{3}$).

In FIG. 3 the "level 1" page 100 with the subcode 0000 and the complementary pages 10A 0001 and 10A 0002 is specified as an example in the second embodiment example according to the invention. The first hexadecimal-numbered complementary page 10A 0001 contains a specially marked section containing complementary data which applies not only to the associated "level 1" page 100 0000 but also no other "level 1" pages—for example, the page 104 0001. Therefore, in this example, the complementary data for 104 0001 is composed of the specially marked section of page 10A 0001, which is not sent separately (again), and the associated complementary page 10E 0100.

The same applies for basic pages with page numbers from 200 onwards. For example, complementary page 10E is allocated to basic page; 104, complementary page 1E0 to basic page 109, and complementary page leg to basic page 199.

One essential feature of the invention lies in the fact that complementary data for pages of lower order is transmitted under page numbers of higher-order page numbers. With a known teletext transmission system ("TOP" system), information about each basic page in the cycle and its allocation to other pages is transmitted in a separate teletext page ("basic TOP table") in the form of a page, group, block classification. This classification is used here in order to differentiate between lower- and higher-order pages. Hereby, a precisely defined location (according to columns and rows) for each basic page is provided on the separate page (BT table).

Table I, shown below, specifies, for example, which hexadecimal complementary page numbers are allocated to the individual basic pages between 100 and 199.

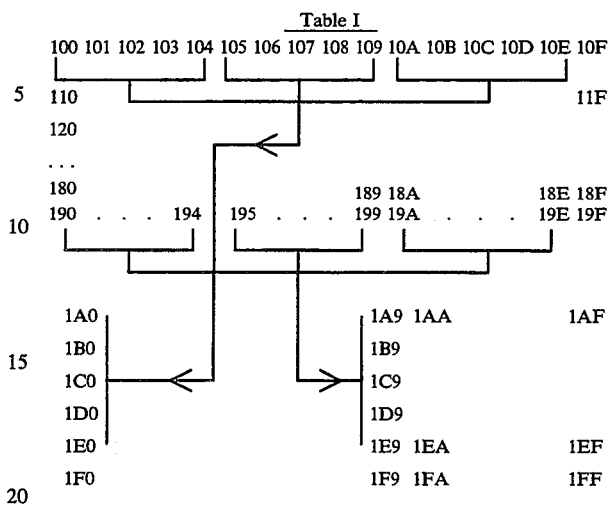

Table I

The PT table is transmitted as another separate page ("pseudo-table" of PT) according to the same column and row allocation as in the BT table; the coding of this PT table is shown in Table II. The PT table contains, for each basic page (at the position of which there is a certain PT code), data concerning the number of complementary pages and additional information as to whether further complementary data is present in higher-order pages.

TABLE II

| Number of complementary pages | Further complementary data in higher-order pages | Code PT |
| --- | --- | --- |
| 0 | — | 0 |
| 1 | — | 1 |
| 2 | — | 2 |
| 3 | — | 3 |
| 4 | — | 4 |
| 5 | — | 5 |
| 6 | — | 6 |
| 7 | — | 7 |
| 0 | yes | 8 |
| 1 | yes | 9 |
| 2 | yes | A |
| 3 | yes | B |
| 4 | yes | C |
| 5 | yes | D |
| 6 | yes | E |
| 7 | yes | F |

Table III, supra, shows the computation rule with which, in the case of multiple pages (i.e. basic page plus subpage(s)), the subcode of the complementary pages can be inferred from the subcode of the basic page and the number of complementary pages (Table II). For example, two complementary pages for basic page 0001 have the subcode 0101 and 0102. The subcode for the basic page represents an "expanded page number" so, for example, the subpages of the multiple page No. 120 possess the page numbers 120 0001, 120 0002, ... . The number components 0001, 0002 represent the subcodes.

TABLE III

| Basic page subcode | Number of complement. pages | Complement. page subcode | Remark |
| --- | --- | --- | --- |
| 0000 | 1 | 0000 | basic page with 1 comp. |
| 0000 | XX | 0001 0002 | basic page with XX comp. |

TABLE III-continued

| Basic page subcode | Number of complement. pages | Complement. page subcode | Remark |
|---|---|---|---|
| 0001 | 1 | 00XX 0100 | 1st subpage with 1 comp. |
| 00YY | X | YY01 YY02 ... YYXX | YYnth subpage with XX comp. |

The following table, Table IV, shows a cycle according to the invention-type method ("higher level cycle") by means of an example.

TABLE IV

| | | Code PT | Complementary data from following comp. pages (com.) |
|---|---|---|---|
| 100 | Block A | 2 | 2 com. of 100 |
| 110 | Group A1 | 1 | 1 com. of 110 |
| 111 | Page A1-1 | 8 | 1 com. of 110 |
| 112 | Page A1-2 | 9 | 1 com. of 110+1 com. of 112 |
| 120 | Group A2 | | |
| 121 | Page A2-1 | | |
| 200 | Block B | 8 | 2 com. of 100 |
| 210 | Group B1 | 9 | 2 com. of 100+1 com. of 210 |
| 211 | Page B1-1 | 9 | 2 com. of 100+1 com. of 210+1 com. of 211 |
| 212 | Page B1-2 | 3 | 3 com. of 212 |
| 220 | Group B2 | | |
| 221 | Page B2-1 | | |

In the cycle illustrated, several pages are combined to form a group and several groups to form a block. A code 1 from Table II indicates, for example, for page 110, that only one complementary page of page 110 and no other complementary pages of the higher-order page 100 are present. Page 111 with PT code 8, on the other hand, indicates that no own complementary pages exist but specially marked sections in the complementary page of page 110 must be taken into account.

Figure 4:
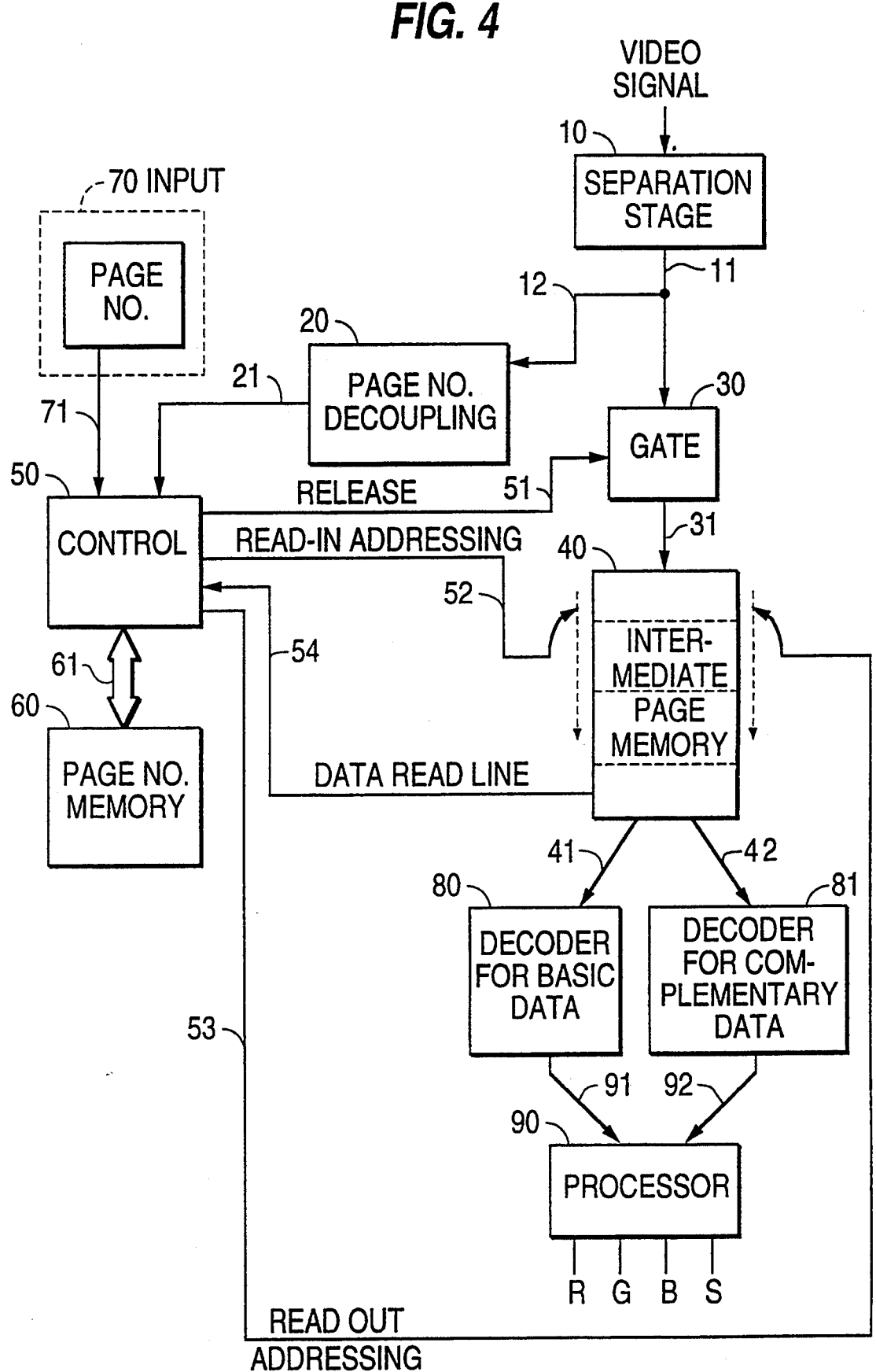
FIG. 4 shows a block circuit diagram of an embodiment of a circuit arrangement for carrying out the method according to the invention.

On the receiver side (FIG. 4), basic data and complementary data are equally separated from the video signal in a separation stage 10 and assembled into individual teletext pages. Every teletext page is fed via the output line 11 to a grate circuit 30 which then feeds the teletext page fed to it via a reading line 31 to an intermediate memory 40 for the page if a control circuit 50, to be more thoroughly explained later, feeds a release signal to the gate circuit 30 via an output line 51. Moreover, the control circuit 50 effects, via a futher output line 52, an addressing of the intermediate page memory 40 for the read-in process. The read-out process of the intermediate page memory 40 is also performed under the control of the control circuit 50 via a third output line 53.

The page numbers for the teletext pages appearing on the line are fed from a page number decoupling circuit 20 to the control circuit 50 via a line 21. Herefor, the decoupling circuit 20 detects the number of each teletext page fed to it from line 11 via a branch connection 12. Further, the control circuit 50 is connected to the input 70 operated by the user. The desired page number is fed to the control circuit via a line 71. In case a separate page arrives with the page numbers of the basic pages (so-called "basic TOP table") or another separate page (PT table according to Table II) with the information as to whether specially marked sections with complementary data for lower-order pages are included and/or with the number of complementary pages for each corresponding basic page, which appear in the cycle of the teletext pages or, respectively, in a cycle section, then these separate pages are or the separate page concerned is automatically fed to the intermediate page memory 40. The data of these intermediately stored separate pages is transmitted via the data reading line 54 to the control circuit 50 which determines the page numbers and the associated quantity of complementary data for each page number and stores them in a page number memory 60 which is connected via a bidirectional bus 61 with the control circuit 50.

With the receiver-side facililty for carrying out the method according to the first embodiment example, it is now assumed that the user, for example, by operating the keyboard 70, has selected the page #100. The control circuit 50 determines the number and the page numbers of the complementary pages allocated to this chosen page. If, for example, the basic page #100 is supplemented by two complementary pages (FIG. 2), then these two complementary pages have the page number #10A with the subpages #0001 and 0002. By means of a clear, fixed relationship between the basic pages #100 through 899 and the associated complementary pages 10A through 1E9 (which, in the example under consideration, are numbered in hexadecimal form) the page numbers of the complementary pages can be easily calculated or determined by means of special tables. As soon as one of these pages appears in the cycle—the control circuit 50 is informed of this by the decoupling circuit 20—a release signal for the gate circuit 30 appears on the output line 51, whereupon the basic page #100, via line 31, is stored, for example, at storage location #1, complementary page 10A 0001 at storage location #2 and complementary page 10A 0002 at storage location #3 of the intermediate page memory 40. The addressing to the storage locations is performed, as already mentioned, under the control of the control circuit 50 via output line 52. After all three pages under consideration are read in, the control circuit 50 generates, via output line 53, a read-out command for storage location #1 whereupon the basic page #100 is read out, via a line 41, from the intermediate page memory 40 into a decoder for basic data 80. The basic data decoder 80 decodes the page #100 in a suitable manner and transfers the resulting data via line 91 to a processor 90. Apart from that, two read-out commands for storage locations #2 and #3 are provided by the control circuit 50 via output line 53 and the complementary pages 10A 0001 and 10A 0002 are read out successively via line 42 into a decoder for complementary data 81. The complementary data decoder 81 decodes the data of the complementary pages in a suitable manner and transfers the resulting data via line 92 to the processor 90 which presents the decoded data of all three pages together as a video signal with the components R, G, B, and S, for example, on the picture screen of a television receiver.

Let it be assumed that the facility on the receiver side is now so modified that it possesses the means for carrying out the method according to the second embodiment example. For the sake of simplicity, the same designations and references as in the foregoing will be used in the following. It is now assumed that the user, for example, by operating the keyboard 70, has selected the page #111. The control circuit 50 determines the number and the page numbers of the complementary pages allocated to this chosen page. If, for example, the basic page #111 is supplemented by complementary data from the higher-order page 110 (Table II), then this complementary page has the page number #11A. As soon as one of these pages appears in the cycle—the control circuit 50 is informed of this by the decoupling circuit 20—a release signal for the gate circuit 30 appears on the output line 51, whereupon the basic page #111, via line 31, is stored, for example, to storage location #1 and complementary page 11A at storage location #2 of the intermediate page memory 40. The addressing of the storage locations is performed, as already mentioned, under the control of the control circuit 50 via output line 52. After all the two pages under consideration are read in, the control circuit 50 generates, via output line 53, a read-out command for storage location #1 whereupon the basic page #111 is read out, via a line 41, from the intermediate page memory 40 into a decoder for basic data 80. The basic data decoder 80 decodes the page #111 in a suitable manner and transfers the resulting data via line 91 to a processor 90. Apart from that, a read-out command for storage location #2 is provided by the control circuit 50 via output line 53 and the complementary page 11A is read out via line 42 into the decoder for complementary data 81. The complementary data decoder 81 decodes the data in the specially marked section of the complementary page in a suitable manner and transfers the resulting data via line 92 to the processor 90 which presents the decoded data of all three pages together as a video signal with the components R, G, B, and S, for example, on the picture screen of a television receiver.

In a particular embodiment, the basic data decoder 80 consists of a teletext level 1 decoder and the decoder for the complementary data transmitted in a videotext build-up code from a videotext (BTX) decoder.

The control circuit 50 can also, according to the first embodiment example, after a user has selected page #100, automatically fill the remaining storage location #4 of the intermediate page memory 40 with a further page. The next following page number in the page number memory 60 is, for example, page #105. Apart from that, the control circuit 50 determines, for example, that no further complementary page is present for the basic page #105. The page #105 can, therefore, be temporarily stored in storage location #4 in the manner already described after its appearance in the teletext cycle.

By using the invention-type method according to the first embodiment example, the available intermediate page memory 40 can be utilized in an adaptive and, consequently, optimum way because only so many storage locations need to be reserved as actually is required for the presentation of any arbitrary page.

A further advantage of this method consists of the fact that missing rows in the complementary pages can be determined in a simple manner and spoiled rows can be fed to a suitable error correction circuit (not illustrated). The control circuit 50 "knows" from the page number memory 60 whether and, if applicable, how many complementary pages are present in the cycle. As all rows in a complementary page in a non-disturbed case are normally occupied, or with a not fully occupied complementary page a special end-of-data identifier can be provided in the last row, the searching and loading process for the intermediate page memory 40, with incomplete or missing complementary pages, can be correspondingly influenced in such a way that, gradually, a page with all complementary pages is completely and correctly temporarily stored.

The control circuit 50 can also, according to the second embodiment example and after the described user's selection of page #111, automatically fill the remaining two storage locations #3 and #4 of the intermediate page memory 40 with further pages. The next following page number in the page number memory 60 is, for example, page #112. Apart from that, the control circuit 50 determines, for example (Table IV), that the basic page #112 is supplemented by the complementary page #11C and the specially marked section of page 11A already loaded into storage location #2. The pages #112 and 110 can, therefore, be temporarily stored in locations #3 and #4 in the manner already described after their appearance in the teletext system and, upon being called up, be presented on the picture screen together with the general data from memory #2.

By using the invention-type method according to the second embodiment example, the available intermediate page memory 40 can be utilized in an optimum way because the complementary data in the specially marked sections apply to several basic pages and do not need to be reloaded every time.

An advantage of this method consists of the fact that the additional data capacity required for level 3 can be minimized. The complementary data cannot just be defined for one page but, on the contrary, also for higher-order pages (groups), a block or for the entire cycle. Therefore, for example, a new color table for the entire cycle, sports logos for the sports block, and equal headlines for news groups can be agreed.

We claim:
1. A method for the transmission of periodically repeated teletext data in a television receiver comprising:
providing teletext data including basic data of conventionally constructed teletext pages, complementary data for teletext pages, with the complementary data for a respective teletext page being in the form of at least one associated complementary page structured in a format of a conventionally constructed teletext page and having page numbers coded in the hexadecimal system which are allocated to page numbers of the associated conventional teletext pages and which are ordered in accordance with a fixed scheme in the decimal system selectable using a ten-key keypad, and separate information about the number of complimentary pages for each associated, conventional teletext page in the format of a separate complimentary page;
transmitting the provided teletext data in a television signal;
receiving the television signal and separating the teletext data from the received signal;

assembling the teletext data belonging to a particular teletext page;

intermediately storing the assembled teletext data, with the teletext basic data of a respective teletext page being separately stored from the associated complementary data pages; and processing the stored teletext data such that the characters allocated to the basic data are made to appear at those character positions where no complementary data is present, and that the characters allocated to the basic data working in conjunction with the complementary data are made to appear at those character positions where complementary data is present.

2. Method according to claim 1, including transmitting the complementary data for several or all teletext pages in at least one complementary page.

3. Method according to claim 1 or 2, including transmitting the complementary data in a Viewdata (Prestel) build-up code.

4. Method according to claim 3, including, on the receiver side, providing separate decoding for the basic data and the complementary data.

5. Method according to claim 1, wherein said separate information includes information as to whether and how many complementary pages with complementary data for several teletext pages, as well as to whether and how many complementary pages which have only page-specific complementary data for each complementary teletext page, are contained in a teletext cycle.

6. Method according to claim 1, wherein said separate information includes further information about the number of rows used.

7. Method according to claims 1 or 5, including transmitting at least that complementary data which applies to several pages with an increased error protection when compared with the basic data.

8. Method according to claim 1, including transmitting the complementary data with an error protection greater than that of the basic data.

9. Method according to claim 1, wherein the complementary data represents, at least partly, error protection data for the associated basic data; and, on the receiver side, using the error protection data for correcting and, if necessary, for substituting associated, disturbed basic data.

* * * * *